(12) United States Patent
Kandala et al.

(10) Patent No.: US 10,521,590 B2
(45) Date of Patent: Dec. 31, 2019

(54) DETECTION DICTIONARY SYSTEM SUPPORTING ANOMALY DETECTION ACROSS MULTIPLE OPERATING ENVIRONMENTS

(71) Applicant: Microsoft Technology Licensing, LLC, Redmond, WA (US)

(72) Inventors: Santosh Subbarayudu Kandala, Sammamish, WA (US); Anna Maria Latuskiewicz, Kirkland, WA (US); Barry Markey, Kirkland, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 158 days.

(21) Appl. No.: 15/254,885

(22) Filed: Sep. 1, 2016

(65) Prior Publication Data
US 2018/0063175 A1  Mar. 1, 2018

(51) Int. Cl.
G06F 21/57 (2013.01)
H04L 29/06 (2006.01)
G06F 21/55 (2013.01)

(52) U.S. Cl.
CPC ............ G06F 21/577 (2013.01); G06F 21/55 (2013.01); H04L 63/145 (2013.01);
(Continued)

(58) Field of Classification Search
CPC ............... G06F 21/577; H04L 63/1433; H04L 63/1416
See application file for complete search history.

(56) References Cited

U.S. PATENT DOCUMENTS 6,738,908 B1  5/2004  Bonn et al.
7,484,237 B2  1/2009  Joly et al.
(Continued)

FOREIGN PATENT DOCUMENTS

WO  2008011576 A2  1/2008

OTHER PUBLICATIONS

Oberheide, J., Cooke, E. and Jahanian, F., Jul. 2008. CloudAV: N-Version Antivirus in the Network Cloud. In USENIX Security Symposium (pp. 91-106).*
(Continued)

*Primary Examiner* — James R Turchen
(74) *Attorney, Agent, or Firm* — Fiala & Weaver P.L.L.C.

(57) ABSTRACT

A detection dictionary system provides a framework for describing, detecting, and reporting anomalies across multiple operating environments each including multiple computing devices. An anomaly in an operating environment refers to one or more operations or activities in the operating environment that may be indicative of an attack on the operating environment by a malicious user or program. The framework includes guarantees, detections, properties, and detection instances. Guarantees are promises or assertions made to an entity (e.g., a business or other organization) that describes what the detection dictionary system will detect and alert on when a particular trend or anomaly is identified. A detection is a set of metadata describing how to fulfill a given guarantee. A property describes how to map the detection to a particular detection instance. A detection instance is a specific implementation of a detection as applied to a property.

20 Claims, 7 Drawing Sheets

(52) U.S. Cl.
CPC ...... *H04L 63/1408* (2013.01); *H04L 63/1416* (2013.01); *H04L 63/1425* (2013.01); *H04L 63/1433* (2013.01); *H04L 63/1441* (2013.01); *H04L 63/20* (2013.01)

(56) References Cited

U.S. PATENT DOCUMENTS

| | | | |
|---|---|---|---|
| 8,141,144 B2 | 3/2012 | Good | |
| 8,463,819 B2 | 6/2013 | Shashikumar et al. | |
| 8,499,330 B1 | 7/2013 | Albisu et al. | |
| 8,646,026 B2 | 2/2014 | Chang | |
| 8,959,568 B2 | 2/2015 | Hudis et al. | |
| 9,294,498 B1* | 3/2016 | Yampolskiy | H04L 63/1433 |
| 9,749,349 B1* | 8/2017 | Czarny | H04L 63/1433 |
| 2003/0182582 A1* | 9/2003 | Park | H04L 63/1433 726/25 |
| 2004/0111643 A1 | 6/2004 | Farmer | |
| 2006/0136986 A1 | 6/2006 | Doolittle | |
| 2008/0034424 A1* | 2/2008 | Overcash | G06F 21/55 726/22 |
| 2009/0208910 A1* | 8/2009 | Brueckner | G09B 5/00 434/11 |
| 2009/0319249 A1* | 12/2009 | White | G09B 19/0053 703/13 |
| 2010/0257610 A1* | 10/2010 | Hohl | G06F 21/51 726/25 |
| 2011/0185432 A1* | 7/2011 | Sandoval | G06F 21/554 726/25 |
| 2012/0174227 A1* | 7/2012 | Mashevsky | G06F 21/562 726/24 |
| 2013/0055394 A1* | 2/2013 | Beresnevichiene | G06F 21/577 726/24 |
| 2013/0185800 A1* | 7/2013 | Miller | G06F 21/568 726/24 |
| 2014/0181975 A1* | 6/2014 | Spernow | G06F 21/562 726/23 |
| 2014/0237606 A1* | 8/2014 | Futoransky | G06F 21/577 726/25 |
| 2014/0259095 A1* | 9/2014 | Bryant | H04L 63/20 726/1 |
| 2015/0172300 A1* | 6/2015 | Cochenour | H04L 63/145 726/23 |
| 2015/0220632 A1* | 8/2015 | Onishi | G06F 16/374 707/748 |
| 2015/0281287 A1 | 10/2015 | Gill et al. | |
| 2015/0286825 A1 | 10/2015 | Freudiger et al. | |
| 2015/0319182 A1* | 11/2015 | Natarajan | G06F 21/53 726/24 |
| 2016/0014078 A1 | 1/2016 | Schrecker et al. | |
| 2016/0099963 A1* | 4/2016 | Mahaffey | H04L 63/0227 726/25 |
| 2016/0226893 A1 | 8/2016 | Warikoo et al. | |
| 2016/0292065 A1* | 10/2016 | Thangamani | G06F 8/65 |
| 2016/0292420 A1* | 10/2016 | Langton | G06F 21/566 |
| 2017/0078922 A1* | 3/2017 | Raleigh | H04W 28/10 |
| 2017/0142068 A1* | 5/2017 | Devarajan | H04L 43/028 |
| 2018/0020012 A1* | 1/2018 | Ikuse | G06F 21/53 |
| 2018/0027006 A1* | 1/2018 | Zimmermann | H04L 63/0245 726/11 |

OTHER PUBLICATIONS

Aquilina, N., 2015. Cross-Platform Malware Contamination.*
Furfaro, A., Garro, A. and Tundis, A., Oct. 2014. Towards security as a service (secaas): On the modeling of security services for cloud computing. In Security Technology (ICCST), 2014 International Carnahan Conference on (pp. 1-6). IEEE. (Year: 2014).*
Trend Micro Control Manager: Service Pack 3 (Administrator's Guide); Jul. 2015, Trend Micro (Year: 2015).*
Sowmya, et al., "An Empirical Framework to Detect Security Attacks on the Cloud Data Storage System", In Proceedings of International Journal of Computer Science Issues, vol. 9, Issue 4, No. 1, Jul. 2012, pp. 265-271.
Cox, et al., "N-Variant Systems—A Secretless Framework for Security through Diversity", In Proceedings of 15th USENIX Security Symposium, Aug. 2006, pp. 1-16.
Casola, et al., "DoS Protection in the Cloud through the SPECS Services" In Proceedings of 10th International Conference on P2P, Parallel, Grid, Cloud and Internet Computing, Nov. 4, 2015, pp. 677-682.
"International Search Report and Written Opinion Issued in PCT Application No. PCT/US2017/048770" dated Nov. 20, 2017, 13 Pages.
Rahaman, et al., "An Attack Pattern Framework for Monitoring Enterprise Information Systems" In 25th IEEE International Conference on Enabling Technologies: Infrastructure for Collaborative Enterprises, Jun. 13, 2016, pp. 173-178.
Swift, David, "A Practical Application of SIM/SEM/SIEM Automating Threat Identification", In Paper of SANS InfoSec Reading Room, Dec. 23, 2006, 41 Pages.

\* cited by examiner

DETECTION DICTIONARY SYSTEM SUPPORTING ANOMALY DETECTION ACROSS MULTIPLE OPERATING ENVIRONMENTS

BACKGROUND

Computing devices have become increasingly commonplace in our lives, and with this, have become increasingly interconnected. This is particularly true in many corporate or enterprise environments. While this increased connectivity has many benefits, it is not without its problems. One such problem is that our devices have become accessible to attack by malicious users or programs that attempt to steal data or information, take over operation of our devices, and so forth. For corporate and enterprise environments, this can be particularly problematic as they may store large amounts of confidential information that may be revealed in the event of an attack. Protecting against such attacks, however, continues to be difficult.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a framework is maintained that supports multiple detections defined in a common manner across multiple operating environments. Each of the multiple detections comprises a set of metadata describing how to fulfill an assurance made to detect an anomaly in at least one of the multiple operating environments. Multiple detections for the multiple operating environments are maintained, and events in the multiple operating environments are monitored. In response to the monitoring detecting that the set of metadata for a detection for at least one environment of the multiple operating environments has been satisfied, a determination is made that an anomaly in the one operating environment has occurred. An anomaly resolution service is alerted that the anomaly in the one operating environment has occurred.

In accordance with one or more aspects, a framework is maintained that supports multiple detections defined in a common manner across multiple operating environments. Each of the multiple detections comprises a set of metadata describing how to fulfill an assurance made to detect an anomaly in at least one of the multiple operating environments. An indication of the multiple detections is presented to authorized users of additional operating environments. User selection of one of the multiple detections is received, and a detection instance for the selected detection for one of the additional operating environments is created based on user input.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
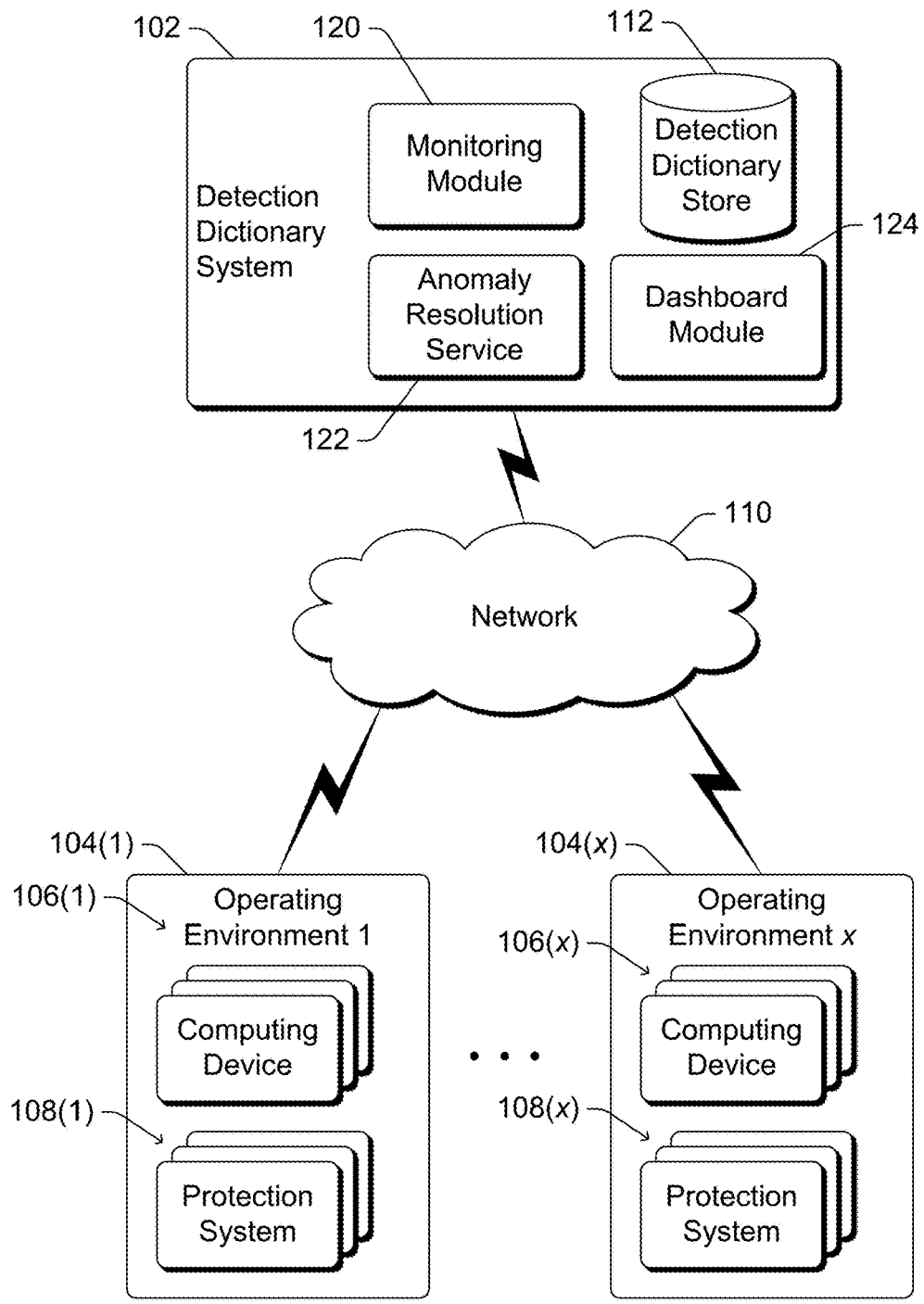
FIG. 1 illustrates an example system implementing the detection dictionary system supporting anomaly detection across multiple operating environments in accordance with one or more embodiments

A detection dictionary system supporting anomaly detection across multiple operating environments is discussed herein. The techniques discussed herein provide a framework for describing, detecting, and reporting anomalies across multiple operating environments each including multiple computing devices. An anomaly in an operating environment refers to one or more operations or activities in the operating environment that may be indicative of an attack on the operating environment by a malicious user or program.

The framework includes guarantees, detections, properties, and detection instances. A guarantee refers to a promise or assertion made to an entity (e.g., a business or other organization) that describes what the detection dictionary system will detect and alert on when a particular trend or anomaly is identified. The alert refers to, for example, notifying one or more security administrators or users for the entity. A detection refers to a set of metadata describing how to fulfill a given guarantee. How to fulfill a given guarantee will vary by operating environment and on the platform choices of each operating environment.

A property refers to a model or representation of the operating environment that maps to the business, service, or technology boundaries of the operating environment. The property describes how to map the detection to a particular detection instance. A detection instance is a specific implementation of a detection as applied to a property.

In response to a detection instance being satisfied, an alert for the detection instance is triggered and a case is created. A case refers to a specific instance of a detection instance being satisfied. The case allows for further investigation of the detection instance and the events that caused the detection instance to be triggered (e.g., automatic and/or manual investigation). A record of the result of the investigation can also be maintained, such as whether the alert was a true positive or a false positive.

The techniques discussed herein provide consistency across operating environments regarding the definition of a detection. This consistency includes describing under what scenarios a detection is designed to be used, which operating environments the detection is currently implemented in and in use, and the history of validation (quality control) exercises applied to the detection to verify correct operation of the detection.

The techniques discussed herein further reduce the time and cost of developing similar security detections across different operating environments (e.g., different divisions within an enterprise). The time and cost of such development is reduced by disclosing to authorized parties that particular detections already exist, disclosing to authorized parties that new detections are under development and by whom, and providing a means of sharing existing implementation details for the detections.

The techniques discussed herein further allow measurement of the effectiveness of detections. This effectiveness can be measured in terms of a common way to identify gaps in detection coverage across different operating environments (e.g., teams or divisions), performing a like-for-like comparison of case volumes across operating environments (e.g., a given detection in one operating environment is triggered regularly, whereas the same detection in another division is never triggered—analysis can be performed as to why this disparity exists), and performing a like-for-like comparison of case outcomes across operating environments (e.g., a given detection in a particular business generates fewer false positives than a comparable detection elsewhere—this could be an opportunity for improvement of the detection that generates more false positives).

FIG. 1 illustrates an example system 100 implementing the detection dictionary system supporting anomaly detection across multiple operating environments in accordance with one or more embodiments. System 100 includes a detection dictionary system 102 and multiple (x) operating environments 104(1), . . . , 104(x). Each operating environment 104 includes multiple computing devices 106(1), . . . , 106(x). An operating environment refers to a collection of computing devices that are treated similarly as a group by an entity that owns, controls, or administers the computing devices. Different entities can own, control, or administer multiple operating environments. For example, each operating environment 104 can be a business division or business group of a particular company.

Each computing device 106 can be a variety of different types of devices, and an operating environment 104 can include the same and/or different types of devices. For example, a computing device 106 can be a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, each computing device 106 may range from a full resource device with substantial memory and processor resources (e.g., personal computers, game consoles) to a low-resource device with limited memory and/or processing resources (e.g., traditional set-top boxes, hand-held game consoles).

The detection dictionary system 102 is implemented using one or more computing devices. The detection dictionary system 102 can be implemented using the same and/or different types of devices. Similar to the discussion of computing devices 106, the detection dictionary system 102 can be implemented using a variety of different types of devices, ranging from full resource devices with substantial memory and processor resources to a low-resource device with limited memory and/or processing resources.

Each operating environment 104 also includes one or more protection systems 108(1), . . . , 108(x). Each protection system 108 is a system designed to protect an operating environment and/or computing devices 106 in the operating environment against attacks from a malicious user or program. This protection can take various different forms, such as preventing malware from running on a computing device, tracking information regarding data accesses (e.g., frequency with which particular data or storage locations such as folders are accessed), and so forth. For example, protection systems 108 can include data loss prevention systems, email monitoring systems, malware detection systems, firewalls, and so forth.

Each protection system 108 is implemented using one or more computing devices. Each protection system 108 can be implemented using the same and/or different types of devices. Similar to the discussion of computing devices 106, each protection system 108 can be implemented using a variety of different types of devices, ranging from full resource devices with substantial memory and processor resources to a low-resource device with limited memory and/or processing resources.

In one or more embodiments, protection systems 108 are implemented on dedicated computing devices in the operating environments 104. For example, a protection system 108 can be implemented on a computing device that is a dedicated email server. Additionally or alternatively, a protection system 108 can be implemented on a computing device 106 that provides other functionality as well. For example, a protection system 108 can be an anti-malware program running on an employee's laptop computer.

The detection dictionary system 102 communicates with protection systems 108 via a network 110. Network 110 can be a variety of different networks, including the Internet, a local area network (LAN), a public telephone network, an intranet, other public and/or proprietary networks, combinations thereof, and so forth. The detection dictionary system 102 obtains various information from the protection system 108 to identify anomalies based on various guarantees, detections, and detection instances as discussed in more detail below.

The detection dictionary system 102 includes a detection dictionary store 112. The detection dictionary store 112 can be implemented using any of a variety of data storage devices, such as magnetic disks, optical discs, solid state memory, and so forth. The detection dictionary store 112 maintains data regarding guarantees, detections, properties, and detection instances.

Figure 2:
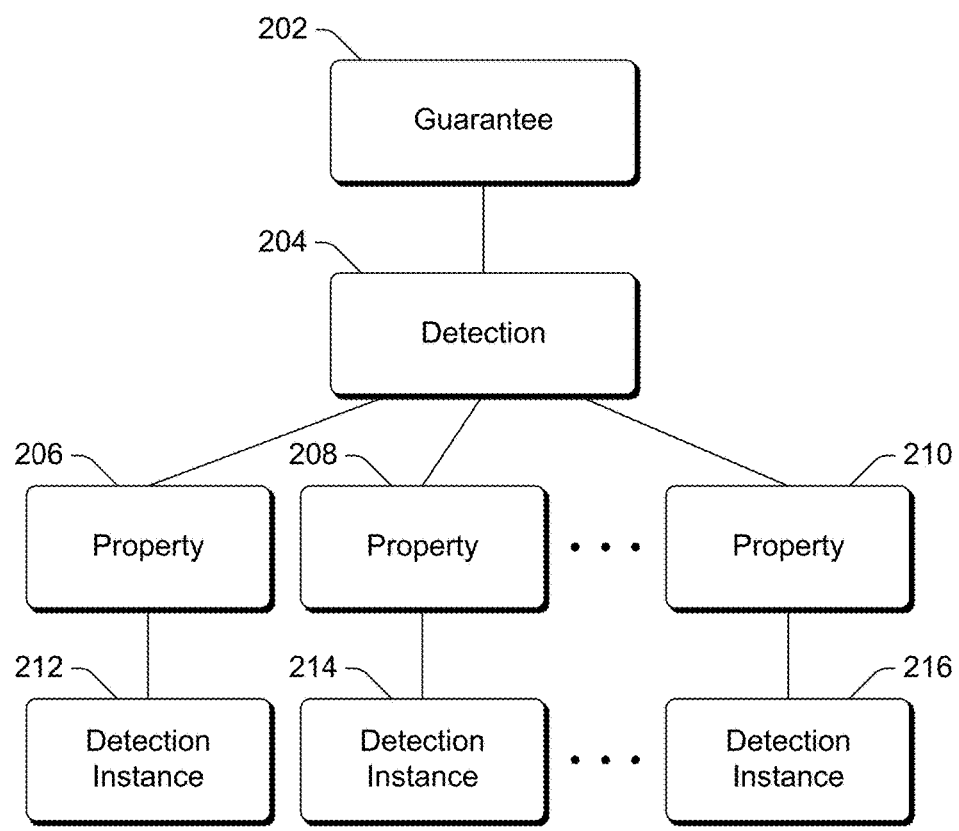
FIG. 2 illustrates an example of detection dictionary store data in accordance with one or more embodiments.

FIG. 2 illustrates an example 200 of detection dictionary store data in accordance with one or more embodiments. The example 200 includes a guarantee 202. As discussed above, a guarantee refers to a promise or assertion made to an entity (e.g., a business or other organization) that describes what the detection dictionary system 102 will detect and alert on when a particular trend or anomaly is identified. The alert refers to, for example, notifying one or more security administrators or users for the entity, or notifying an anomaly resolution service of the detection dictionary system. This guarantee is a high level promise or assertion of what the detection dictionary system 102 will detect and alert on, such as detecting leakage of credit card information from the operating environment with at least a threshold level of confidence (e.g., 99%), detecting improper changes in accounts on computing devices (e.g., account creation and/or deletion), detecting suspicious computing device logon or computing device logoff activity, and so forth. Providing this high level promise or assertion allows non-technical or users that don't specialize in security to understand what the detection dictionary system 102 provides for their system.

The guarantees can be created in a variety of different manners. In one or more embodiments, guarantees are created by the security personal or other users of an operating environment 104. Additionally or alternatively, guarantees can be created by other users or entities, such as users of other operating environments 104, developers or administrators of the detection dictionary system 102, and so forth.

The guarantee 202 has an associated detection 204. A detection refers to a set of metadata describing how to fulfill a given guarantee, and the detection 204 is a set of metadata describing how to fulfill the guarantee 202. The detection 204 can be thought of as a recipe for how to fulfill the guarantee 202. A guarantee is a high level promise or assertion of what the detection dictionary system 102 will detect and alert on, and a detection is a set of metadata describing how that high level promise or assertion will be carried out. It should be noted that the detection is generic—the detection is not specific to any particular platform (e.g., is not specific to any particular operating system, hardware, type of computing device, etc.). Detection instances, in contrast to detections, are specific to a particular platform and are discussed in more detail below.

By way of example, assume that a guarantee in the detection dictionary system 102 is to detect improper changes in accounts on computing devices in the operating environment (e.g., account creation and/or deletion). Multiple detections can be associated with that guarantee that describe how that guarantee is carried out, such as detecting an account being enabled but having a creation date that is more than a threshold number (e.g., 7 days) in the past, detecting an account being deleted with no reasoning or indication as to why the account is deleted, and so forth.

The framework discussed herein provides consistency in the definition of a detection across operating environments. This consistency includes describing under what scenarios a detection is designed to be used (e.g., what guarantee the detection is designed to fulfill, what stage of a kill chain the detection is designed to address). This consistency also includes identifying which operating environments the detection is actually implemented and in use at any given time. This consistency also includes maintaining a history of validation (quality control) exercises applied to the detection to verify it's correct operation (e.g., resulting in true positive case statuses as discussed below).

A detection has various categorization attributes that describe how the detection is used and/or allows measurement of the effectiveness of the detection. In one or more embodiments, these categorization attributes include detection attack categories and a kill chain. These categorization attributes allow, for example, for the normalization of detections from their detection instance specifics.

In one or more embodiments, the detection attack categories are different categories of attacks that attackers may try to use. Each detection is assigned one of these detection attack categories. The detection attack categories can be assigned in different manners, such as by the creator of the detection. In one or more embodiments, the detection attack categories include: identity, host/OS, network, malware, resource depletion, misconfiguration, abuse of function, other, and NA (not applicable).

The identity category refers to password based attacks, such as attempts to guess a password to an account.

The host/OS category refers to attacks against a host operating system (OS) of a computing device and/or a file system of a computing device.

The network category refers to network attacks, such as attacks with malformed packets.

The malware category refers to attacks that use malware on a computing device (e.g., installation or attempts to install malware on a computing device).

The resource depletion category refers to attacks that deplete a resource to the point that the target's functionality is adversely affected. Such attacks include, for example, denial of service (DoS) attacks, distributed denial of service (DDoS) attacks, and so forth.

The misconfiguration category refers to attacks against assets (e.g., computing devices, software, firewalls, etc.) that have been configured leaving them vulnerable. For example, a situation in which a system administrator makes a change to a firewall but leaves the access controls (ACLs) off of the firewall, leaving it vulnerable to external attackers.

The abuse of function category refers to exploiting software vulnerabilities. These software vulnerabilities include bugs or other vulnerabilities in software running on various devices (e.g., computing devices 106 of FIG. 1, a firewall, and so forth).

The other category refers to a catch all for any attacks that don't fit into the above categories.

The NA category refers to a category used for case reporting, as discussed in more detail below. This category is used in situations in which a case is opened but does not have an attack category (e.g., tuning trigger status, false positive status, hygiene issues status, as discussed below).

The kill chain categorization attributes refer to one or more stages of a kill chain to which the detection corresponds. In one or more embodiments, the kill chain is a sequence of stages that an attacker is likely to use in attacking a computing device. In one or more embodiments, the kill chain stages include: reconnaissance, weaponization, delivery, exploitation, installation, command and control, and actions on objectives.

The reconnaissance stage refers to research, identification and selection of targets. For example, the reconnaissance stage can include scanning activities against open ports or hosts, harvesting email addresses, and so forth.

The weaponization stage refers to determining what mechanism or technique to use to attack the computing device. For example, this includes exploiting a backdoor, weakness, or other information obtained during the reconnaissance stage to deliver a payload (e.g., malware).

The delivery stage refers to delivering the payload to the computing device. This can be performed in various manners, such as via email, network connection, portable solid state drive (e.g., a USB thumb drive), and so forth.

The exploitation stage refers to exploiting a vulnerability to execute code on the computing device being attacked. The code that is executed is the payload provided to the computing device in the delivery stage.

The installation stage refers to installing malware, a backdoor, or other mechanism on the computing device being attacked that allows the attacker to maintain persistence at the computing device within the operating environment.

The command and control stage refers to communicating with an attacker's device via a network (e.g., the Internet).

Typically, compromised computing devices beacon outbound to an Internet controller server to establish a command and control channel. Once the command and control channel is established, the attacker has access to the computing device (e.g., as if he were sitting at the computing device using the keyboard or other input mechanisms of the computing device).

The actions on objectives stage refers to performing various malicious acts as desired by the attacker. Given the command and control channel, the attacker can accomplish their original goal in attacking the computing device.

The detection dictionary system 102 supports multiple different types of detections. In one or more embodiments, the detection dictionary system 102 supports atomic detections, computational detections, and behavioral detections.

Atomic detections refer to detection of strings of data or single artifacts in a data repository (e.g., a log) that indicates suspicious activity. For example, an event in security log about user creation. In some situations, atomic detections may not be indicators of compromise by themselves, but they can be building blocks for the computational and behavioral detections.

Computational detections refer to detections that are a result of correlation of multiple feeds of data streams and/or computational outcomes of artifacts enriched by contextual attributes and/or analytics. For example, a detection may identify the target network address (e.g., Internet Protocol (IP) address) in an out-bound communication and correlate geographic information of the network address with the normal or typical service operations to find suspicious traffic. In this example, the detection can consider multiple data feeds such as a network address database, geospatial data lookups, geographies where business is expected from and possible noise conditions such as employees on vacation. Computational detections leverage several atomic detections and enrichment sources that are dynamic in nature.

Behavioral detections refer to detections that are targeted to identify tools, tactics and procedures associated with an attacker. These types of detections are intelligence driven and use multiple data sources, often across multiple properties and can involve a long range of time span (e.g., days, weeks, or months). For example, a detection may be to identify an attacker that is masquerading a compromised account to access a service. Most of the actions in such a situation are legitimate and normal by themselves, like running a script or connecting to a domain controller, and cannot be detected by atomic detections unless the normal or typical behavior is well-modeled and anomalies are being monitored. For behavioral detections, it is the action sequence that is analyzed rather than just the actions themselves.

How to fulfill a given guarantee will vary by operating environment and on the platform choices of each operating environment. The detection 204 includes multiple properties 206, 208, and 210. A property refers to a model or representation of the operating environment that maps to the business, service, or technology boundaries of the operating environment. Each of the properties 206, 208, and 210 describes how to map the detection 204 to a particular detection instance 212, 214, and 216, respectively. Each of the particular detection instances 212, 214, and 216 corresponds to, for example, a different operating environment.

Each detection instance 212, 214, and 216 is a specific implementation of the detection 204 as applied to a property 206, 208, and 210, respectively. For example, if the detection 204 is detecting an account being enabled but having a creation date that is more than a threshold number (e.g., 7 days) in the past, then the detection instances 212, 214, and 216 describe, for a given property, how to detect such an account. E.g., the detection instance can describe where account information is stored, how to determine that an account has been enabled, how to determine what the creation date of the account is, and so forth. Each detection instance can specify various different criteria, such as atomic detections, computational detections, behavioral detections, combinations thereof, and so forth.

Returning to FIG. 1, the detection dictionary system 102 includes a monitoring module 120. The monitoring module 120 collects data regarding events from the protection systems 108. Various different events are identified by the protection systems 108. The detection instances in the detection dictionary store 112 indicate what events are analyzed for those detection instances, and the monitoring module 120 notifies the protection systems to monitor the operating environments 104 for these events. The protection systems 108 monitor the operating environments 104 for these events, and report the occurrence of these events (e.g., send data identifying the events that occurred) to the monitoring module 120. An event refers to a particular value, setting, or collection of data (e.g., a register value, a firewall setting, a file) and/or activity (e.g., the writing of a value, the saving of a file, the installation or execution of a program).

The monitoring module 120 analyzes the events that occur in the operating environments 104, and determines for each operating environment 104 whether any detection instances are satisfied. A detection instance is satisfied if the criteria included in the detection instance have occurred. For example, if a detection instance for a particular operating environment indicates that a particular action sequence is to occur, then the monitoring module 120 monitors the events that occur in that particular operating environment to determine whether the particular action sequence specified has occurred, and determines that the detection instance is satisfied if the particular action sequence specified has occurred.

In response to a detection instance being satisfied, the monitoring module 120 triggers an alert that the detection instance has been satisfied. Security personal (e.g., analysts, administrators, etc.) for the operating environment for which the detection instance is satisfied can also be notified (e.g., by email or message, by log entry, and so forth).

In one or more embodiments, the monitoring module 120 also notifies the anomaly resolution service 122 that the detection instance has been satisfied. The anomaly resolution service 122 creates a case in response to the detection instance being satisfied. A case refers to a specific instance of a detection instance being satisfied, and identifies both the detection instance and a current status of the case. The case also optionally includes an indication of the events that caused the monitoring module 120 to determine that the detection instance was satisfied.

In one or more embodiments, the current status of the case is one of: investigation, true positive, false positive, incident, hygiene issues, and tuning trigger. The current status of the case when the case is created is set to a default status of investigation. The investigation status indicates that the detection instance is being investigated. This investigation can be performed in various manners, such as by determining whether the detection instance worked as expected or intended, whether malicious activity is identified, and so forth. The investigation can be performed manually (e.g., by a security administrator analyzing the detection instance and the events that resulted in the determination that the detection instance was satisfied), automatically (e.g., by one or more modules of the anomaly resolution service 122), or combinations thereof. After investigation is finished, the status of the The true positive case status indicates that the detection instance (and the detection associated with the detection instance) is working as expected. For example, if the detection instance is that user "Bob" logged in, and the investigation indicates that user "Bob" did actually log in (e.g., user "Bob" confirms that he logged in), then the case status for the detection instance is true positive.

The false positive case status indicates that a detection instance was triggered that was not malicious activity. Situations can also arise in which a case is created by a security administrator or other analyst assuming malicious activity was occurring but turned out to be a false lead, in which case the case status is set to false positive.

The incident case status indicates that the detection instance being satisfied has been confirmed as a policy violation or malicious activity. In one or more embodiments, a security administrator or team for the operating environment in which the detection instance was satisfied is notified to resolve the policy violation or malicious activity.

The hygiene issues case status indicates that a monitored system is misconfigured or operating in a manner that is not in alignment with desired practices or policies for the operating environment. These conditions are difficult to remediate and can cause lot of "known noise" if not tuned properly. A development team or administrator for the program or device that caused the detection instance to be satisfied is notified to remediate the situation, and the case remains with the hygiene issues case status until the program or device has been modified to remediate the situation. For example, a design pattern in the operating system may cause a detection instance to be satisfied even though there is no malicious activity. For various reasons (e.g., cost, old version of the product, etc.), the program or device that caused the detection instance may not be altered to keep the detection instance from being satisfied. By keeping the status for cases resulting from that detection instance being satisfied at hygiene issues, the detection dictionary system 102 knows that the detection instance is working but false positives are not being reported because of this known issue. The hygiene issues status allows these situations of misconfiguration or operation in a manner that is not in alignment with desired practices or policies to continue to be monitored without increasing the number of false positives reported for the detection instance.

The tuning trigger case status indicates that the detection instance (and/or associated detection) the conditions of which were satisfied to produce the alert is to be modified. For example, additional refinement to the detection instance is desired so that the detection instance results in fewer false positive cases.

In one or more embodiments, the detection dictionary system 102 allows the detections and detection instances to be shared across different operating environments 104. The detection dictionary system 102 maintains a record of one or more authorized users (e.g., security administrators or analysts for operating environments 104) for the detections and detection instances of each operating environment 104. The detection dictionary system 102 allows an authorized user from one operating environment 104 to copy and modify as desired a detection and/or detection instance of another operating environment 104. This allows the authorized user to generate a new detection or detection instance for his or her operating environment more quickly as it is based on an existing detection or detection instance rather than requiring one to be generated from scratch.

For example, the operating environments 104 can be different business divisions of the same organization. Each of these different business divisions can have their own security administrators and/or analysts. The detections and/or detection instances generated by a security administrator in one business division can thus be made available to and copied by the security administrator in another business division. The security administrator in one business division thus need not expend the time and effort to re-create a detection and/or detection instance already created by a security administrator in another business division.

The detection dictionary system 102 also includes a dashboard module 124. The dashboard module 124 presents a user interface for the detection dictionary system 102, allowing users to view and input changes to the guarantees, detections, properties, and detection instances. The dashboard module 124 also allows a user to create a new detection and/or detection instance. For example, a user in one operating environment can select a detection and/or detection instance used by another operating environment, and have that selected detection and/or detection instance used for the user's operating environment (optionally with additional changes for the user's operating environment).

In one or more embodiments, the dashboard module 124 displays various information regarding the detections and associated detection instances. For example, the dashboard module 124 can display one or more stages of the kill chain to which the detection and/or associated detection instances correspond. By way of another example, the dashboard module can display an effectiveness of the detection instance.

The detection dictionary system 102 maintains a record of the effectiveness of the detection instances. This is based on, for example, information provided by the anomaly resolution service 122. The case status for each detection instance as determined by the anomaly resolution service 122 can be saved along with the detection instance. This allows the dashboard module 124 of the detection dictionary system 102 to also display the effectiveness of a detection and/or detection instance.

The effectiveness of a detection instance can be determined and displayed in various manners. For example, the number of cases resulting from the detection instance being satisfied that had a true positive case status can be displayed. By way of another example, the number of cases resulting from the detection instance being satisfied that had a false positive case status can be displayed. By way of yet another example, values generated based on case status (e.g., a percentage of the total number of cases resulting from the detection instance being satisfied that had a true positive case status) can be displayed.

The effectiveness of a detection can be determined and displayed in various manners. For example, the effectiveness can be a value generated based on the effectiveness of the detection instances associated with the detection, such as an average of the number of cases resulting from the detection instances being satisfied that had a true positive case status, a total of the number of cases resulting from the detection instances being satisfied that had a true positive case status, and so forth.

In one or more embodiments, each detection also includes a development indication that identifies what stage of development or use the detection is in (e.g., being developed, being tested, confirmed and in use). The dashboard module 124 can provide indications of this development indication for the various detections. This allows, for example, authorized users to see what detections are being developed or currently used by different operating environments.

Figure 3:
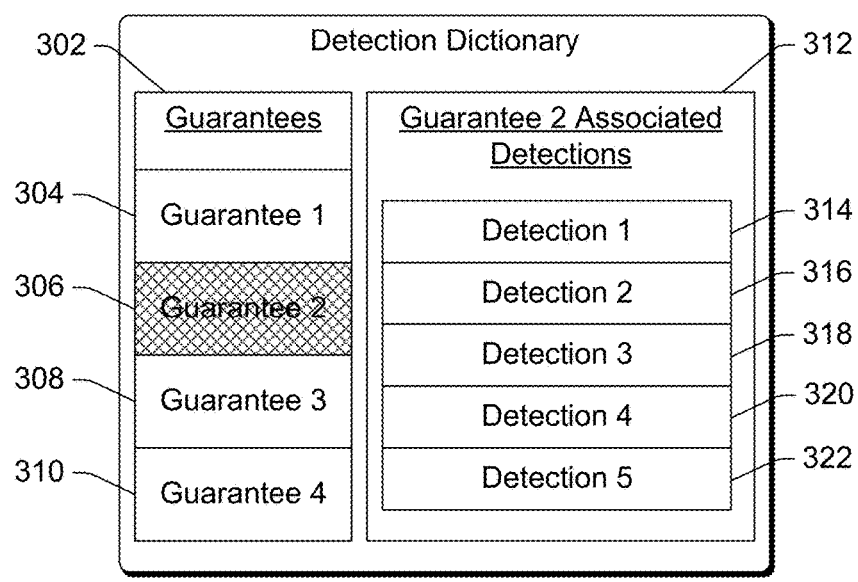
FIG. 3 illustrates an example user interface for the detection dictionary system in accordance with one or more embodiments.

FIG. 3 illustrates an example user interface 300 for the detection dictionary system in accordance with one or more embodiments. The user interface 300 is generated and displayed by, for example, the dashboard module 124 of FIG. 1. The user interface 300 includes a guarantees portion 302 in which multiple guarantee descriptions 304, 306, 308, and 310 are displayed. The guarantee descriptions 304, 306, 308, and 310 can take various forms, such as text descriptions, user-selectable tiles or links, icons or other images, combinations thereof, and so forth. In the illustrated example, the guarantee description 306 is selected, shown with cross-hatching in FIG. 3.

In response to user selection of the guarantee description 306, in a detections portion 312 multiple detection descriptions 314, 316, 318, 320, and 322 are displayed. Each of the detection descriptions 314, 316, 318, 320, and 322 describes a detection associated with the selected guarantee description 306. The detection descriptions 314, 316, 318, 320, and 322 can take various forms, such as text descriptions, user-selectable tiles or links, icons or other images, combinations thereof, and so forth.

Various additional information or user-selectable options can be provided via the user interface 300. For example, an icon, button, menu item, command line, and so forth can be provided to allow a user to copy a detection described by one of the detection descriptions 314, 316, 318, 320, and 322. By way of another example, an icon, button, menu item, command line, and so forth can be provided to allow a user to add a new detection associated with a guarantee described by one of the described by one of the guarantee descriptions 304, 306, 308, and 310. By way of another example, information indicating the effectiveness of the detections described by the detection descriptions 314, 316, 318, 320, and 322 can be displayed.

Figure 4:
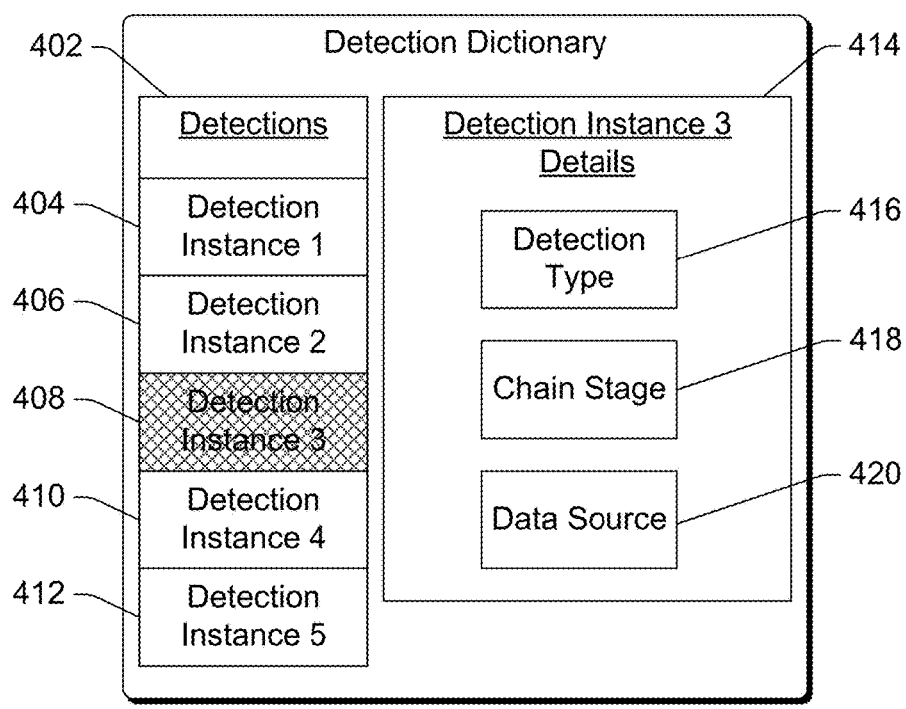
FIG. 4 illustrates another example user interface for the detection dictionary system in accordance with one or more embodiments.

FIG. 4 illustrates another example user interface 400 for the detection dictionary system in accordance with one or more embodiments. The user interface 400 is generated and displayed by, for example, the dashboard module 124 of FIG. 1. The user interface 400 includes a detections portion 402 in which multiple detection instance descriptions 404, 406, 408, 410, and 412 are displayed. The detection instance descriptions 404, 406, 408, 410, and 412 are displayed can take various forms, such as text descriptions, user-selectable tiles or links, icons or other images, combinations thereof, and so forth. In the illustrated example, the detection instance description 408 is selected, shown with cross-hatching in FIG. 4.

In response to user selection of the detection instance description 408, in a detection instance details portion 414 multiple detection details regarding the detection instance description 408 are displayed. These details can be displayed in various manners, such as text descriptions, user-selectable tiles or links, icons or other images, combinations thereof, and so forth. In the illustrated example of FIG. 4, the detection instance details include a detection type 416, a chain stage 418, and a data source 420. The detection type 416 is, for example, one of the detection types discussed above (e.g., atomic detection, computational detection, or behavioral detection). The chain stage 418 is, for example, an indication of one or more stages of the kill chain discussed above for which the detection instance is used. The data source 420 is, for example, an indication of where data/events for the detection instance are obtained (e.g., one or more protection systems 108 of FIG. 1 from which events come).

Various additional information or user-selectable options can be provided via the user interface 400. For example, an icon, button, menu item, command line, and so forth can be provided to allow a user modify the detection type 416, the chain stage 418, and/or the data source 420. By way of another example, information indicating the effectiveness of the detection instances described by the detection instance descriptions 404, 406, 408, 410, and 412 can be displayed.

Figure 5:
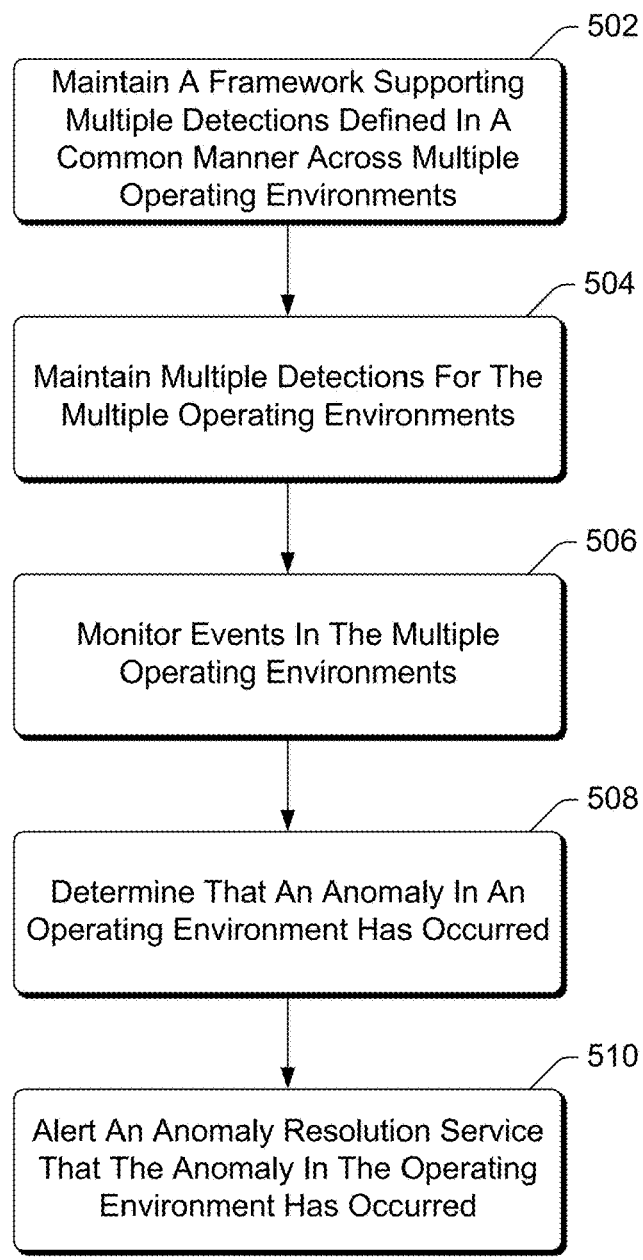
FIG. 5 is a flowchart illustrating an example process for implementing a detection dictionary system supporting anomaly detection across multiple operating environments in accordance with one or more embodiments.

FIG. 5 is a flowchart illustrating an example process 500 for implementing a detection dictionary system supporting anomaly detection across multiple operating environments in accordance with one or more embodiments. Process 500 is carried out by a detection dictionary system, such as detection dictionary system 102 of FIG. 1, and can be implemented in software, firmware, hardware, or combinations thereof. Process 500 is shown as a set of acts and is not limited to the order shown for performing the operations of the various acts. Process 500 is an example process for implementing a detection dictionary system supporting anomaly detection across multiple operating environments; additional discussions of implementing a detection dictionary system supporting anomaly detection across multiple operating environments are included herein with reference to different figures.

In process 500, a framework supporting multiple detections defined in a common manner across multiple operating environments is maintained (act 502). This framework includes guarantees, detections, and detection instances as discussed above. These guarantees, detections, and detection instances can be stored in any of a variety of storage devices as discussed above.

Multiple detections are maintained for the multiple operating environments (act 504). Each operating environment can have multiple detections, and detection instances from one operating environment can be copied and adapted for use in other operating environments as discussed above.

Events in the multiple operating environments are monitored (act 506). These events are identified by and received from, for example, various protection systems in the operating environments.

A determination is made that an anomaly in operating environment has occurred (act 508). This determination is made based on the monitoring of events and comparison of the events to the detection instances associated with detections for the operating environment.

An anomaly resolution service is alerted that the anomaly in the operating environment has occurred (act 510). A case is generated, and various investigation into the anomaly and recording of information regarding the anomaly and the detection instance is maintained as discussed above.

Figure 6:
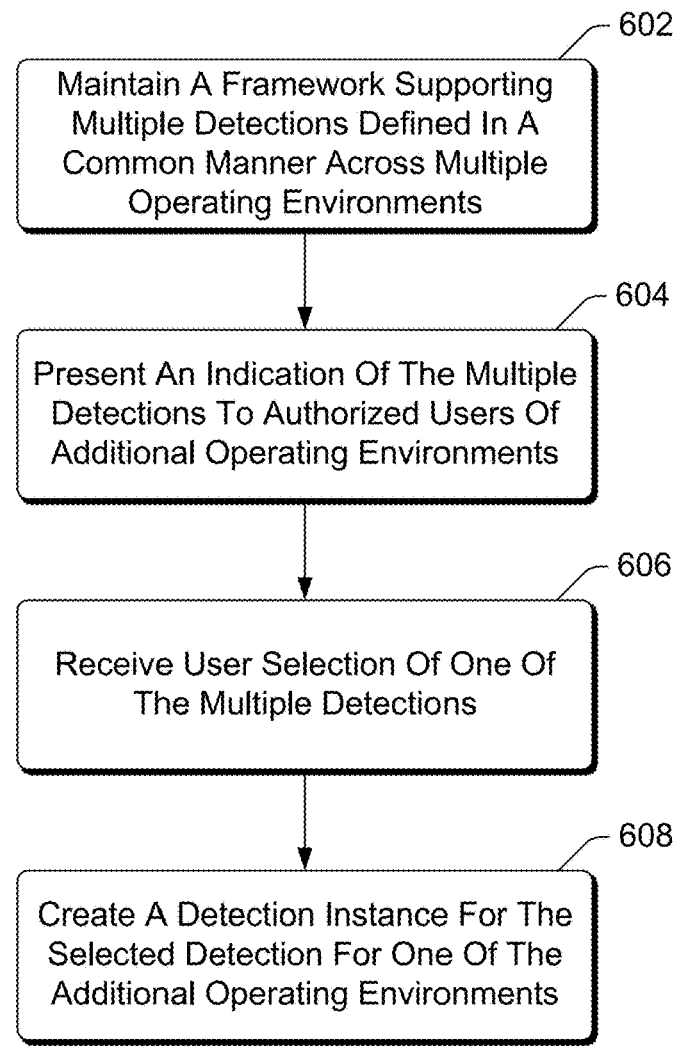
FIG. 6 is another flowchart illustrating an example process for implementing a detection dictionary system supporting anomaly detection across multiple operating environments in accordance with one or more embodiments.

FIG. 6 is a flowchart illustrating an example process 600 for implementing a detection dictionary system supporting anomaly detection across multiple operating environments in accordance with one or more embodiments. Process 600 is carried out by a detection dictionary system, such as detection dictionary system 102 of FIG. 1, and can be implemented in software, firmware, hardware, or combinations thereof. Process 600 is shown as a set of acts and is not limited to the order shown for performing the operations of the various acts. Process 600 is an example process for implementing a detection dictionary system supporting anomaly detection across multiple operating environments; additional discussions of implementing a detection dictionary system supporting anomaly detection across multiple operating environments are included herein with reference to different figures.

In process 600, a framework supporting multiple detections defined in a common manner across multiple operating environments is provided (act 602). This framework includes guarantees, detections, and detection instances as discussed above.

An indication of the multiple detections is presented to an authorized user of additional operating environments (act 604). For each of the multiple detections, these additional operating environments are, for example, ones of the multiple operating environments for which the detection does not currently apply.

A user selection of one of the multiple detections is received (act 606). This user selection can take various forms, such as selection of an icon, button, menu item, and so forth.

A detection instance is created for the selected detection for one of the additional operating environments (act 608). The created detection instance is based on a detection instance associated with a different operating environment, but is adapted to the one of the additional operating environments. The one of the additional operating environment is specified by, for example, the authorized user.

The techniques discussed herein support various different usage scenarios. For example, security administrators or other authorized users can review, via the user interface provided by the detection dictionary system, the effectiveness of detection instances in different operating environments. If the effectiveness of different detection instances associated with the same detection are different, then the security administrator or other user can review the detection instances to determine why and improve the effectiveness of the less effective detection instance.

By way of another example, security administrators or other authorized users can review, via the user interface provided by the detection dictionary system, which detections are being used in a particular operating environment and the effectiveness of those detections in that particular operating environment. The security administrators or other authorized users can then copy and adapt selected ones of those detections for use in other operating environments.

By way of another example, security administrators or other authorized users can review, via the user interface provided by the detection dictionary system, which types of attacks are being used against a particular operating environment. If an attack is being used against a particular operating environment (as determined, for example, based on the number of true positive case status determinations for cases resulting from a particular detection), the security administrators or other authorized users can expect that a similar attack may be used against other operating environments in the near future and be better prepared for such attacks (e.g., by ensuring the proper detections are in place for the other operating environments).

By way of yet another example, security administrators or other authorized users can review, via the user interface provided by the detection dictionary system, where in the kill chain current attacks against a particular operating environment are being made. If an attack is being made against an early stage of the kill chain, the security administrators or other authorized users can expect that additional attacks later in the kill chain may be coming in the near future and be better prepared for such attacks (e.g., by ensuring the proper detections are in place for those later stages of the kill chain).

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 7:
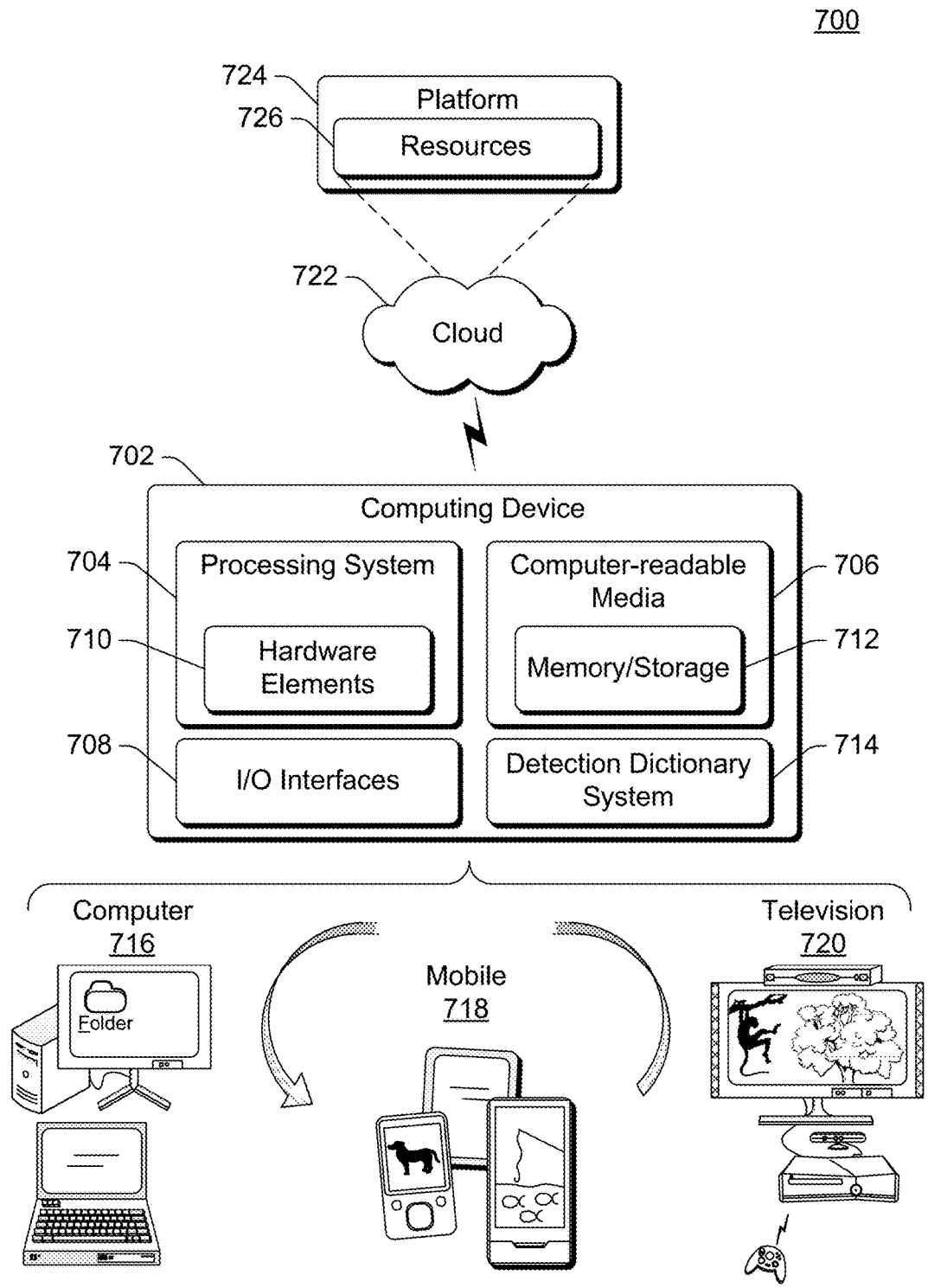
FIG. 7 illustrates an example system that includes an example computing device that is representative of one or more systems and/or devices that may implement the various techniques described herein.

FIG. 7 illustrates an example system generally at 700 that includes an example computing device 702 that is representative of one or more systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Resistive RAM (ReRAM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

The one or more input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

The computing device 702 also includes a detection dictionary system 714. The detection dictionary system 714 provides various anomaly detection and reporting functionality as discussed above. The detection dictionary system 714 can implement, for example, the detection dictionary system 102 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method in a system, the method comprising: maintaining a framework supporting multiple detections defined in a common manner across multiple operating environments, each of the multiple detections comprising a set of metadata describing how to fulfill an assurance made to detect an anomaly in at least one of the multiple operating environments; maintaining multiple detections for the multiple operating environments; monitoring events in the multiple operating environments; determining, in response to the monitoring detecting that the set of metadata for a detection for at least one environment of the multiple operating environments has been satisfied, that an anomaly in the one operating environment has occurred; and alerting an anomaly resolution service that the anomaly in the one operating environment has occurred.

Alternatively or in addition to any of the above described methods, any one or combination of: the method further comprising allowing user selection of different ones of the multiple detections to be used for different ones of the multiple operating environments; each of the multiple detections having one or more associated detection instances including metadata describing how to fulfill the assurance in a particular one of the multiple operating environments; the method further comprising measuring, for each of the detection instances, an effectiveness of the detection instance, and maintaining, as associated with each detection instance, a record of the effectiveness of the detection instance; the metadata for each detection instance indicating one or more stages of a kill chain to which the associated detection corresponds; each of the multiple operating environments comprising one of multiple business divisions of an organization; the method further comprising generating a case for the anomaly, and recording a status of the case after investigation of the case is completed; the status of the case being selected from the group including: investigation, true positive, false positive, incident, hygiene issues, and tuning trigger; the method further comprising presenting an indication of the multiple detections for of the multiple operating environments to authorized users of additional operating environments of the multiple operating environments, receiving user selection of one of the multiple detections, and creating, based on user input, a detection instance for the selected detection for one of the additional operating environments.

A method in a system, the method comprising: maintaining a framework supporting multiple detections defined in a common manner across multiple operating environments, each of the multiple detections comprising a set of metadata describing how to fulfill an assurance made to detect an anomaly in at least one of the multiple operating environments; presenting an indication of the multiple detections to authorized users of additional operating environments; receiving user selection of one of the multiple detections; and creating, based on user input, a detection instance for the selected detection for one of the additional operating environments.

Alternatively or in addition to any of the above described methods, any one or combination of: the method further comprising displaying, for each of the multiple operating environments, an effectiveness of the detection in the operating environment; each of the multiple operating environments comprising one of multiple business divisions of an organization.

A system comprising: a processor; and a computer-readable storage medium having stored thereon multiple instructions that, responsive to execution by the processor, cause the processor to: maintain a framework supporting multiple detections defined in a common manner across multiple operating environments, each of the multiple detections comprising a set of metadata describing how to fulfill an assurance made to detect an anomaly in at least one of the multiple operating environments; maintain multiple detections for the multiple operating environments; monitor events in the multiple operating environments; determine, in response to the monitoring detecting that the set of metadata for a detection for at least one environment of the multiple operating environments has been satisfied, that an anomaly in the one operating environment has occurred; and alert an anomaly resolution service that the anomaly in the one operating environment has occurred.

Alternatively or in addition to any of the above described systems, any one or combination of: the multiple instructions further causing the processor to allow user selection of different ones of the multiple detections to be used for different ones of the multiple operating environments; each of the multiple detections having one or more associated detection instances including metadata describing how to fulfill the assurance in a particular one of the multiple operating environments; the multiple instructions further causing the processor to measure, for each of the detection instances, an effectiveness of the detection instance, and maintain, as associated with each detection instance, a record of the effectiveness of the detection instance; the metadata for each detection instance indicating one or more stages of a kill chain to which the associated detection corresponds; the multiple instructions further causing the processor to generate a case for the anomaly, and record a status of the case after investigation of the case is completed; the status of the case being selected from the group including investigation, true positive, false positive, incident, hygiene issues, and tuning trigger; the multiple instructions further causing the processor to present an indication of the multiple detections for of the multiple operating environments to authorized users of additional operating environments of the multiple operating environments, receive user selection of one of the multiple detections, and create, based on user input, a detection instance for the selected detection for one of the additional operating environments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a system, the method comprising:
    maintaining, in a detection dictionary store stored in data storage, data describing a framework supporting multiple detections defined in a common manner across multiple operating environments, the data including:
        a plurality of assertions including a first assertion made to an entity, the first assertion including a description of what the system is configured to detect and alert upon with respect to detection of an anomaly,
        a plurality of detections associated with the assertion including a first detection, the first detection comprising a set of metadata describing how to fulfill the first assertion in at least one of the multiple operating environments,
        a plurality of properties, each property being a model of an operating environment that maps to a boundary of the operating environment, the properties including a first property and a second property, and
        a plurality of detection instances associated with the first detection, the plurality of detection instances having
            a first associated detection instance that comprises first data, in the detection dictionary store, describing how to fulfill the first assertion in a first of the multiple operating environments, the first property describing how to map the first detection to the first associated detection instance, and
            a second associated detection instance that comprises second data, in the detection dictionary store, describing how to fulfill the first assertion in a second of the multiple operating environments, the first data being different than the second data, the second property describing how to map the first detection to the second associated detection instance;
    maintaining, in the detection dictionary store in the data storage, multiple detections for the multiple operating environments;
    monitoring events in the multiple operating environments;
    determining, in response to the monitoring detecting that the set of metadata for a detection for one environment of the multiple operating environments has been satisfied, that an anomaly in the one operating environment has occurred; and
    alerting an anomaly resolution service that the anomaly in the one operating environment has occurred.

2. The method as recited in claim 1, further comprising allowing user selection of different ones of the multiple detections to be used for different ones of the multiple operating environments.

3. The method as recited in claim 1, the first of the multiple operating environments being a different operating environment than the second of the multiple operating environments.

4. The method as recited in claim 3, further comprising:
    measuring, for each of the detection instances, an effectiveness of the detection instance; and
    maintaining, as associated with each detection instance, a record of the effectiveness of the detection instance.

5. The method as recited in claim 3, the metadata for each detection instance indicating one or more stages of a kill chain to which the associated detection corresponds.

6. The method as recited in claim 1, each of the multiple operating environments comprising one of multiple business divisions of an organization.

7. The method as recited in claim 1, further comprising:
    generating a case for the anomaly; and
    recording a status of the case after investigation of the case is completed.

8. The method as recited in claim 7, the status of the case being selected from the group including: investigation, true positive, false positive, incident, hygiene issues, and tuning trigger.

9. The method as recited in claim 1, further comprising:
    presenting an indication of the multiple detections for each of the multiple operating environments to authorized users of additional operating environments of the multiple operating environments;
    receiving user selection of one of the multiple detections; and
    creating, based on user input, a detection instance for the selected detection for one of the additional operating environments.

10. A method in a system, the method comprising:
    maintaining, in a detection dictionary store stored in data storage, data describing a framework supporting multiple detections defined in a common manner across multiple operating environments, the data including:
        a plurality of assertions including a first assertion made to an entity, the first assertion including a description of what the system is configured to detect and alert upon with respect to detection of an anomaly,
        a plurality of detections associated with the assertion including a first detection, the first detection comprising a set of metadata describing how to fulfill the first assertion in at least one of the multiple operating environments, a plurality of properties, each property being a model of an operating environment that maps to a boundary of the operating environment, the properties including a first property and a second property, and a plurality of detection instances associated with the first detection, the plurality of detection instances having a first associated detection instance that comprises first data, in the detection dictionary store, describing how to fulfill the first assertion in a first of the multiple operating environments, the first property describing how to map the first detection to the first associated detection instance, and a second associated detection instance that comprises second data, in the detection dictionary store, describing how to fulfill the first assertion in a second of the multiple operating environments, the first data being different than the second data, the second property describing how to map the first detection to the second associated detection instance;

presenting an indication of the multiple detections to authorized users of additional operating environments;

receiving user selection of one of the multiple detections; and creating, based on user input, a third detection instance associated with the selected detection for one of the additional operating environments.

11. The method as recited in claim 10, further comprising displaying, for each of the multiple operating environments, an effectiveness of the detection in the operating environment.

12. The method as recited in claim 10, each of the multiple operating environments comprising one of multiple business divisions of an organization.

13. A system comprising:

a hardware processor;

a detection dictionary store stored in data storage; and a computer-readable storage medium having stored thereon multiple instructions that, responsive to execution by the processor, cause the processor to:

maintain, in the detection dictionary store stored in the data storage, data describing a framework supporting multiple detections defined in a common manner across multiple operating environments, the data including:

a plurality of assertions including a first assertion made to an entity, the first assertion including a description of what the system is configured to detect and alert upon with respect to detection of an anomaly, a plurality of detections associated with the assertion including a first detection, the first detection comprising a set of metadata describing how to fulfill the first assertion in at least one of the multiple operating environments, a plurality of properties, each property being a model of an operating environment that maps to a boundary of the operating environment, the properties including a first property and a second property, and a plurality of detection instances associated with the first detection, the plurality of detection instances having a first associated detection instance that comprises first data, in the detection dictionary store, describing how to fulfill the first assertion in a first of the multiple operating environments, the first property describing how to map the first detection to the first associated detection instance, and a second associated detection instance that comprises second data, in the detection dictionary store, describing how to fulfill the first assertion in a second of the multiple operating environments, the first data being different than the second data, the second property describing how to map the first detection to the second associated detection instance;

maintain, in the detection dictionary store in the data storage, multiple detections for the multiple operating environments;

monitor events in the multiple operating environments;

determine, in response to the monitoring detecting that the set of metadata for a detection for one environment of the multiple operating environments has been satisfied, that an anomaly in the one operating environment has occurred; and alert an anomaly resolution service that the anomaly in the one operating environment has occurred.

14. The system as recited in claim 13, the multiple instructions further causing the processor to allow user selection of different ones of the multiple detections to be used for different ones of the multiple operating environments.

15. The system as recited in claim 13, the first of the multiple operating environments being a different operating environment than the second of the multiple operating environments.

16. The system as recited in claim 15, the multiple instructions further causing the processor to:

measure, for each of the detection instances, an effectiveness of the detection instance; and maintain, as associated with each detection instance, a record of the effectiveness of the detection instance.

17. The system as recited in claim 15, the metadata for each detection instance indicating one or more stages of a kill chain to which the associated detection corresponds.

18. The system as recited in claim 13, the multiple instructions further causing the processor to:

generate a case for the anomaly; and record a status of the case after investigation of the case is completed.

19. The system as recited in claim 18, the status of the case being selected from the group including: investigation, true positive, false positive, incident, hygiene issues, and tuning trigger.

20. The system as recited in claim 13, the multiple instructions further causing the processor to:

present an indication of the multiple detections for each of the multiple operating environments to authorized users of additional operating environments of the multiple operating environments;

receive user selection of one of the multiple detections; and create, based on user input, a detection instance for the selected detection for one of the additional operating environments.

* * * * *